3,154,510
POLYVINYL ACETATE PAINTS OF INCREASED ADHESION CONTAINING BARIUM COMPOUNDS

Loren A. Bryan, Morton Grove, Ill., and William A. Tidridge, Fanwood, N.J., assignors to FMC Corporation, New York, N.Y., a corporation of Delaware
No Drawing. Filed Aug. 8, 1961, Ser. No. 129,983
2 Claims. (Cl. 260—29.6)

The present invention is concerned with increasing the adhesion of films of water-thinned, polyvinyl acetate and acrylic based latex paints to surfaces to which they are applied.

Paints based on synthetic resin latices have become increasingly important as surface coatings. These latex paints are very advantageous because their quick drying and their good surface covering properties obviate the skillful painting techniques required in applying oil-based paints.

The principal latex used in these paints is based on a butadiene-styrene copolymer. Latices of the polymers of acrylic acid esters and the polymers of polyvinyl acetate when applied as surface coatings form films which have good physical properties including flex resistance, resistance to oil, and marked durability. However, these latices have not enjoyed wide-spread acceptance despite their desirable properties, because of the poor adhesion their films exhibit to various base surfaces. As a result, there has been a serious need for a method of improving the adhesion of the polyvinyl acetate and acrylic acid ester water-based paints to base surfaces coated with these paints.

It is an object of the present invention to increase the adhesion of polyvinyl acetate and acrylic acid ester latex emulsions to painted base surfaces without otherwise affecting the other desirable properties of the paint.

These and other objects will be obvious from the following disclosure.

It has now been found unexpetcedly that water-thinned latex paints which contain either a polyvinyl acetate base, or an acrylic acid ester base, have increased adhesion to base surfaces coated with these paints, when they contain an organic salt which is either a barium cyanurate, barium phytate, barium sulfostearate, barium sulfopalmitate or barium dodecylbenzene sulfonate, in an amount of about 0.5 to 1% by weight.

The barium cyanurates and barium phytate when employed with polyvinyl acetate base paints also increase the corrosion resistance of these paints. This feature is described and claimed in our co-pending application, "Corrosion Resistant Paints," Serial No. 129,958, filed on even date herewith.

The water-thinned paints defined above are saturated polymeric materials having no iodine number as distinguished from natural latex emulsions and butadiene-styrene copolymer emulsions whose polymeric make-up contains unsaturated groups which give sizable iodine numbers. The instant paints have the base ingredient suspended in the form of an aqueous emulsion. When this aqueous emulsion is applied to a surface, the water evaporates and the resulting latex particles coalesce into a linear film polymer, without crosslinking. Typical formulations for acrylic acid ester based emulsions are given below as Formula I and Formula II.

FORMULA I

Acrylic Latex White Paint [1]

| Ingredient: | Lb./gal. |
|---|---|
| Titanium oxide, rutile | 2.137 |
| Calcium carbonate | 0.471 |
| Magnesium silicate | 0.829 |
| Diatomaceous silica | 0.925 |
| Acrylic latex (46NV) [2] | 4.073 |
| Carboxymethyl cellulose, 5% aqueous | 0.159 |
| Tamol 731, 10% aqueous [3] | 0.065 |
| Acrysol A-3, 10% aqueous [4] | 0.065 |
| Boric acid | 0.063 |
| Diethylene glycol | 0.084 |
| Triton X-102 [5] | 0.022 |
| Polyglycol P-1200 [6] | 0.021 |
| Ammonium hydroxide, 28% aqueous | 0.043 |
| Water | 2.491 |

[1] Basic formulation from "Acrylic Emulsion Technology," p. 9, Rohm and Haas.
[2] The acrylic latex polymer was made up from a mixture of 284 ml. of de-ionized water, 24 grams of Triton X-200 (a 28% alkylaryl sulfonate emulsifier in aqueous solution), 4 ml. of a solution of 0.3 gram of $FeSO_4 \cdot 7H_2O$ in 200 ml. of water, 1 gram of ammonium bisulfate, and 200 grams of ethyl acrylate. This mixture was placed in the flask and 1 gram of sodium metabisulfite and 5 drops of 70% tertiary butyl hydrogen peroxide was added to the mixture. Within 2 to 5 minutes the temperature went up to 89° C. The mixture was permitted to stand for 15 minutes at which time 98% of the acrylic resin had polymerized. The result was a 46% solids emulsion.
[3] A sodium salt of a high molecular weight polycarboxylic acid in a 10% aqueous solution.
[4] Water soluble thickener composed of a 10% solution of ammonium polyacrylate.
[5] An alkylaryl polyether alcohol.
[6] Polyethylene glycol.

FORMULA II

Acrylic Latex White Paint

| Ingredient: | Parts by weight |
|---|---|
| Water | 37.3 |
| Ethylene glycol | 25.0 |
| Triton CF-10 [1] | 4.0 |
| Tamol 731 [2] | 8.6 |
| Bubble breaker 748 | 4.0 |
| Titanox RA-NC ($TiO_2$) | 175.0 |
| Snowflake whiting [3] | 244.0 |
| Acrylic latex (46NV) [4] | 574.7 |
| 3% Methocel 4000 (65H6) [5] | 65.7 |
| Ammonium hydroxide | 2.0 |
| PMA-18 [6] | 9.0 |

[1] Polyoxyethylene ether of octyl benzene.
[2] A sodium salt of a high molecular weight polycarboxylic acid in a 10% aqueous emulsion.
[3] Calcium carbonate.
[4] The acrylic latex polymer was made up from a mixture of 284 ml. of de-ionized water, 24 grams of Triton X-200 (a 28% alkylaryl sulfonate emulsifier in aqueous solution), 4 ml. of a solution of 0.3 gram of $FeSO_4 \cdot 7H_2O$ in 200 ml. of water, 1 gram of ammonium bisulfate, and 200 grams of ethyl acrylate. This mixture was placed in the flask and 1 gram of sodium metabisulfite and 5 drops of 70% tertiary butyl hydrogen peroxide was added to the mixture. Within 2 to 5 minutes the temperature went up to 89° C. The mixture was permitted to stand for 15 minutes at which time 98% of the acrylic resin had polymerized. The result was a 46% solids emulsion.
[5] Methylcellulose with a viscosity of 4000 cps.
[6] Phenylmercuric acetate.

A typical formulation for a polyvinyl acetate based latex emulsion is given in Formula III.

FORMULA III

*Polyvinyl Acetate White Latex Paint*

| Ingredient: | Lb./gal. |
|---|---|
| Titanium oxide, rutile | 2.472 |
| Silica | 0.438 |
| Calcium silicate | 0.461 |
| Polyvinyl acetate emulsion (55NV) [1] | 3.000 |
| Tamol 731, 10% aqueous [2] | 0.034 |
| Dibutyl phthalate | 0.247 |
| Hexylene glycol | 0.185 |
| Ethylene glycol | 0.309 |
| Pluronic L-62 [3] | 0.025 |
| Aerosol OT, 75% aqueous [4] | 0.034 |
| Methocel 4000 cps., 2% aqueous [5] | 2.247 |
| Water | 1.657 |

[1] The 55% non-volatile polyvinyl acetate emulsion was prepared by mixing together 45 grams of water, 1% Triton X-200 (a 28% alkylaryl sulfonate emulsifier in aqueous solution) and 1% of a low viscosity polyvinyl alcohol in a flask equipped with a reflux condenser. To this mixture was added a half-gram of ammonium persulfate and 5 parts of vinyl acetate. The mixture was heated to a temperature of about 90° C. The balance of the vinyl acetate (50 parts) was added while refluxing over a period of several hours. The resulting emulsion contained 55% non-volatile material and had a viscosity of about 1200–1400 cps.
[2] A sodium salt of a high molecular weight polycarboxylic acid in a 10% aqueous solution.
[3] A polyethylene oxide-polypropylene oxide condensate with a molecular weight of about 2500.
[4] Dioctyl ester of sodium sulfosuccinic acid.
[5] An aqueous methyl cellulose solution having a viscosity of 4000 cps.

The increase in adhesion varies depending upon which of two types of latex emulsions is employed, and which barium salt is added to the emulsion. In general, the barium cyanurate salts have been found most effective in the acrylic latex emulsions. The barium cyanurates which can be employed are barium hydrogen cyanurate, barium di-hydrogen cyanurate, barium cyanurate, and mixtures of the above. Of the barium salt additives employed with the polyvinyl acetate latex emulsions, barium cyanurates, barium phytate and barium sulfostearate were the most effective.

The following examples illustrate the improved adhesion obtained by the inclusion of the specified barium salts and are presented as representative of the present invention but are not intended as limitative thereof.

EXAMPLE 1

The paint formulation found in Formula I, given above, was prepared in the following manner. The water was weighed into a 1-liter beaker and there was added, with stirring, in the order given: 5% aqueous carboxymethyl cellulose solution, polyglycol P-1200, 28% ammonium hydroxide, Acrysol A-3, 10% Tamol 731, boric acid, Triton X-102 and diethylene glycol. This mixture was stirred until it had reached a workable homogeneity. Stirring was continued and there was added in the order: titanium oxide, calcium carbonate, magnesium silicate and diatomaceous silica. The mixture was stirred until a uniform consistency was obtained. It was passed through a Morehouse Mill two times. The mill slurry was collected in a tared beaker, weighed and a quantity of acrylic latex based on the paste yield was added with stirring. Stirring was continued until 20 minutes had elapsed. The pH of the beaker was adjusted to 9.4 by the addition of small amounts of ammonium hydroxide solution.

The control formulation used in the example was made up as described above. The experimental formulations were made up exactly as set forth above except that each of the barium salts designated in Table I was added to the formulations during the blending operation, after the addition of the calcium carbonate but before the addition of the magnesium silicate. The control formulations and the experimental formulations containing the various salts were applied to the surface of bare, mild, steel, metal test panels and were tested for adhesion by means of a Hoffman Scratch-Hardness Tester. This instrument consists of a graduated beam equipped with weights that exert a force on a hollow cylindrical scratch tool. These are mounted on a flat carriage with 4 wheels that can be drawn over a flat painted surface. The adhesion is made by cutting a line all the way through the test film down to the metal substrate. The edge of the scratching tool is placed in the cut and moved at right-angles to the cut. The adhesion test is the weight in grams of force on the scratching tool required to cause the film to be removed cleanly from the substrate. Details for the use and maintenance of the instrument are provided in "Instructions for Hoffman-Scratch Hardness Tester," PH 1750A, Gardner Laboratory, Inc. (December 1957). The results of the testing are reported in Table I.

EXAMPLE 2

The paint formulations in Formula III were prepared in the following manner. The polyvinyl acetate interior white paint was obtained by preparing a mixture of the prepared polyvinyl emulsion, plasticizers and wetting agents into a "Paint Base." Simultaneously, a mixture of water and pigment with thickener and dispersion agents is made up as a "Pigment Slurry." The paint is prepared by adding the "Paint Base" to the "Pigment Slurry."

The "Paint Base" was prepared by mixing in the following order, and with stirring, the hexylene glycol, ethylene glycol, Pluronic L-62, Aerosol OT, dibutyl phthalate and about 39% of the water required in Formulation II. After mixing 5 minutes, the prepared polyvinyl emulsion was added gradually and the entire mixture was stirred for 30 minutes. The "Pigment Slurry" was prepared by adding the remaining 61% of the water required by the formulation in a beaker and 10% aqueous Tamol 731, 2% aqueous Methocel, titanium oxide, diatomaceous silica and calcium silicate. The additions were made with constant stirring until the slurry was smooth and free of lumps.

The finished paint was prepared by adding the "Paint Base" to the "Pigment Slurry" with constant stirring. The mixture was stirred until it appeared homogeneous and was then passed twice through a Day 3-roll mill until a fineness of grind of 5H was obtained.

The designated "H" refers to the Hegman grind gauge which was used in the determination. The method for using this gauge is described by Gordon and Dolgin in "Surface Coatings and Finishes," Chemical Publishing Company, New York (1954). The proper use of this instrument is further reported in an article by Doubleday and Barkman, printed in the "Paint, Oil and Chemical Review (June 22, 1950)."

The control formulation used in this example was made up exactly as described above. The experimental formulations were made up exactly as set forth above except that each of the barium salts designated in Table I was added when the "Paint Base" was added to the "Pigment Slurry." The formulations were tested as set forth in Example 1 and the results are reported in Table I.

*Table I*

ADHESION OF WATER THINNABLE PAINTS

| Ingredient | Wt. Percent Added | Example 1 Acrylic Interior Adhesion | Example 2 PVA Interior Adhesion |
|---|---|---|---|
| None | 0 | 950 | 175 |
| Barium Dodecylbenzene Sulfonate | 1 | 1,575 | 275 |
| Barium Sulfopalmitate | 1 | 1,575 | 300 |
| Barium Sulfostearate | 1 | 2,275 | 325 |
| Barium Phytate | 1 | 2,275 | 350 |
| Barium Cyanurate | 1 | 2,375 | 500 |

EXAMPLE 3

The paint formulations in Formula II were prepared in the same maner as Example 1. These formulations were tested by coating a sample of the test paint over a glossy linseed oil exterior house paint film coated on a lacquered chart. The adhesion of the test paint to the oil-painted glossy surface was tested by trying to separate the test coating from the glossy paint surface by scratching with a sharp surface. The results are given in Table II.

*Table II*

| Adhesion to Glossy Surface | Control | 0.5 wt. percent Barium Cyanurate | 1.0 wt. percent Barium Cyanurate |
|---|---|---|---|
| Wet | 7 | 8 | 10 |
| Dry | 7+ | 8+ | 10 |

10—excellent; 9—very good; 8—good; 6—fairly good; 4—fair; 2—poor; 0—failure.

The present class of barium salts are effective in improving the adhesion of these latex paints to bare metal surfaces as well as to surfaces which have coatings of paint. This is demonstrated in Table II wherein the adhesion of the latex paint to a house-painted surface was improved by the addition of one of the presently employed barium salts. It is thus seen that this increased adhesion is obtained even with surfaces which are difficult for paints to adhere to. As a result of the present additives, these latex paints can be employed in new fields of application which heretofore were closed to these latex paints because of their poor adhesion.

The barium additives materially increase the hardness of the latex paint films. The increase in hardness is on the order of between 100% to 250% in both the acrylic latex and the polyvinyl acetate latex. This added hardness is most desirable since it affords a film which is adherent to the base and which also can resist abrasion and impact stress. Resistance to impact and abrasion is very important when the paints are applied as floor coatings and are subject to severe abrasion and wear.

While the improvement in the adhesion of the latex paints defined above, is the prime interest of this application, it has been noted that these barium additives also increase the adhesion of many solvent-thinned paints. Typical of these are the air-drying oil base, alkyd resin base, epoxy base, and other similar non-water-thinned latex type paints. This increased adhesion is obtained without affecting the other desirable properties of the solvent-thinned paints, and is useful where increased adhesion is necessary.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. The method of increasing the adhesion of water-thinned polyvinyl acetate base latex paints which comprises adding to said paints a barium salt selected from the group consisting of barium sulfostearate, barium sulfopalmitate, and barium dodecylbenzene sulfonate, in the amount of 0.5 to 1% by weight of said paints.

2. A composition of matter comprising an adherent water-thinned polyvinyl acetate base latex paint containing a barium salt selected from the group consisting of barium sulfostearate, barium sulfopalmitate, and barium dodecylbenzene sulfonate, said salt being present in the amount of 0.5 to 1% by weight of said paints.

References Cited in the file of this patent

UNITED STATES PATENTS 2,702,284    Brock _____ Feb. 15, 1955